(12) United States Patent
Chang (10) Patent No.: US 6,202,652 B1
(45) Date of Patent: Mar. 20, 2001

(54) METHOD FOR MAKING INTEGRALLY VANITY

(76) Inventor: Wun-Ho Chang, 5 Lane 381, Section 1, Chung Shan Road, Yuan Lin Township, Chan Hua Hsien (TW)

( * ) Notice: Subject to any disclaimer, the term of this patent is extended or adjusted under 35 U.S.C. 154(b) by 0 days.

(21) Appl. No.: 09/442,764

(22) Filed: Nov. 18, 1999

(51) Int. Cl.⁷ .............................. A45D 24/00; A45D 7/04; F21P 1/02
(52) U.S. Cl. ........................ 132/200; 132/207; 362/492
(58) Field of Search ................................. 132/200, 207; 362/492, 135, 136, 137, 142, 144

(56) References Cited

U.S. PATENT DOCUMENTS

| | | | | |
|---|---|---|---|---|
| 5,337,890 | * | 8/1994 | Lai | 206/235 |
| 5,651,605 | * | 7/1997 | Corn | 362/83.1 |
| 5,685,629 | * | 11/1997 | Hemmeke et al. | 362/140 |
| 6,126,302 | * | 10/2000 | Corn | 362/492 |

* cited by examiner

Primary Examiner—John J. Wilson
Assistant Examiner—Robyn Kieu Doan
(74) Attorney, Agent, or Firm—Bacon & Thomas, PLLC (57) ABSTRACT

A method for making integrally a vanity involves a first step in which a mirror frame with one side thereof being punched and pressed is arranged in a rotary receiving seat such that the unpunched and unpressed side of the mirror frame faces upwards and extends beyond the top of the rotary receiving seat. The mirror is then pressed by a press disk. The mirror frame is provided on a side edge thereof with a rolling wheel perpendicular to the rotary receiving seat. The rolling wheel is provided in the wheel rim thereof with an arcuate groove. The mirror frame and the press disk are actuated by the rotary receiving seat to turn, thereby enabling the protruded edge of the mirror frame to be pressed slowly by the rolling wheel such that the protruded edge is provided with a curved edge which is formed by the arcuate groove of the rolling wheel, and that the mirror is fixed by the point fastening. The rolling wheel and the press disk are then returned to their respective original position.

6 Claims, 8 Drawing Sheets

METHOD FOR MAKING INTEGRALLY VANITY

FIELD OF THE INVENTION

The present invention relates generally to a vanity, and more particularly to a method for making integrally the vanity.

BACKGROUND OF THE INVENTION

Figure 1:
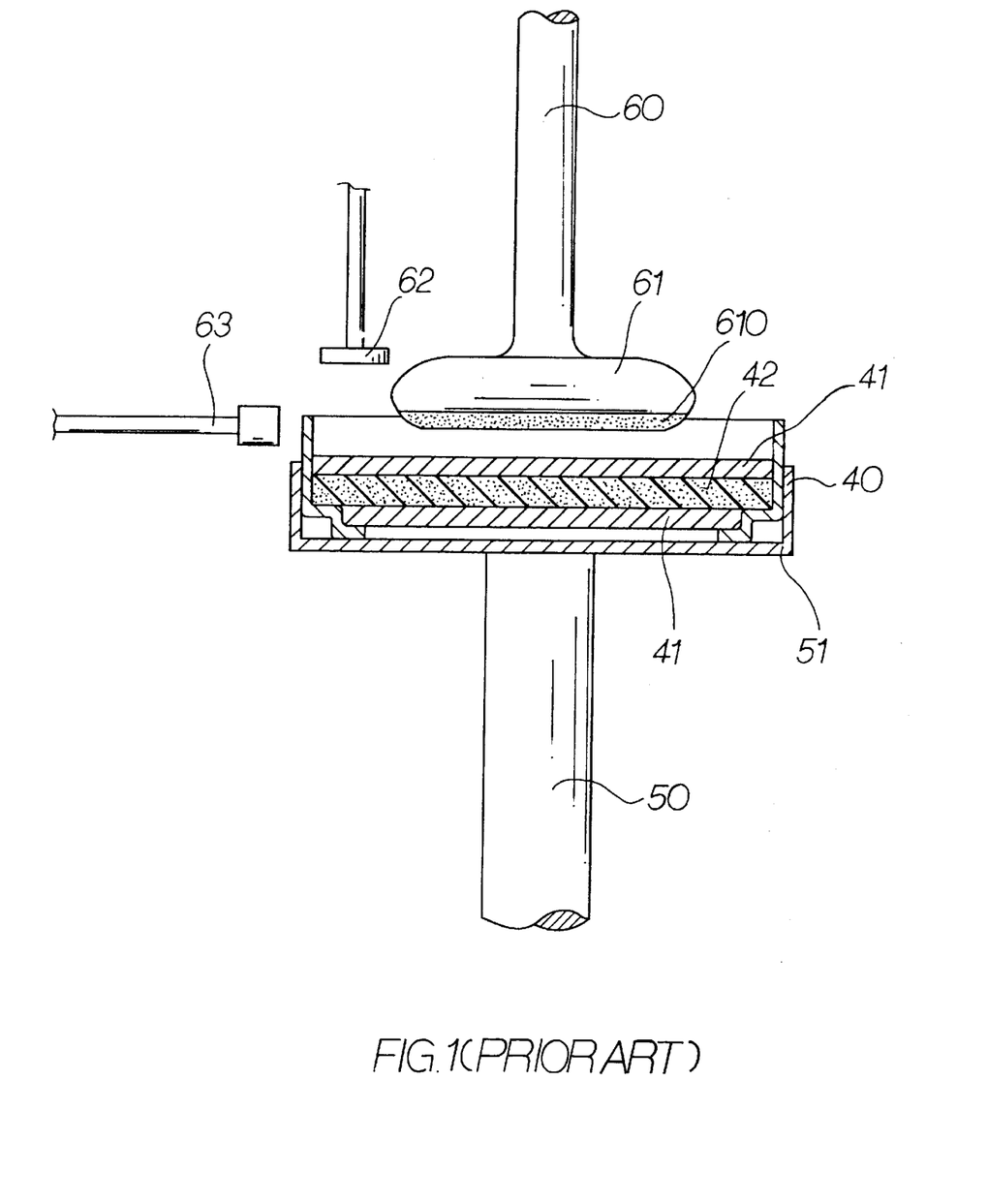
FIG. 1 shows a schematic view of a pre-fabrication of a vanity made integrally by a method of the prior art.
Figure 2:
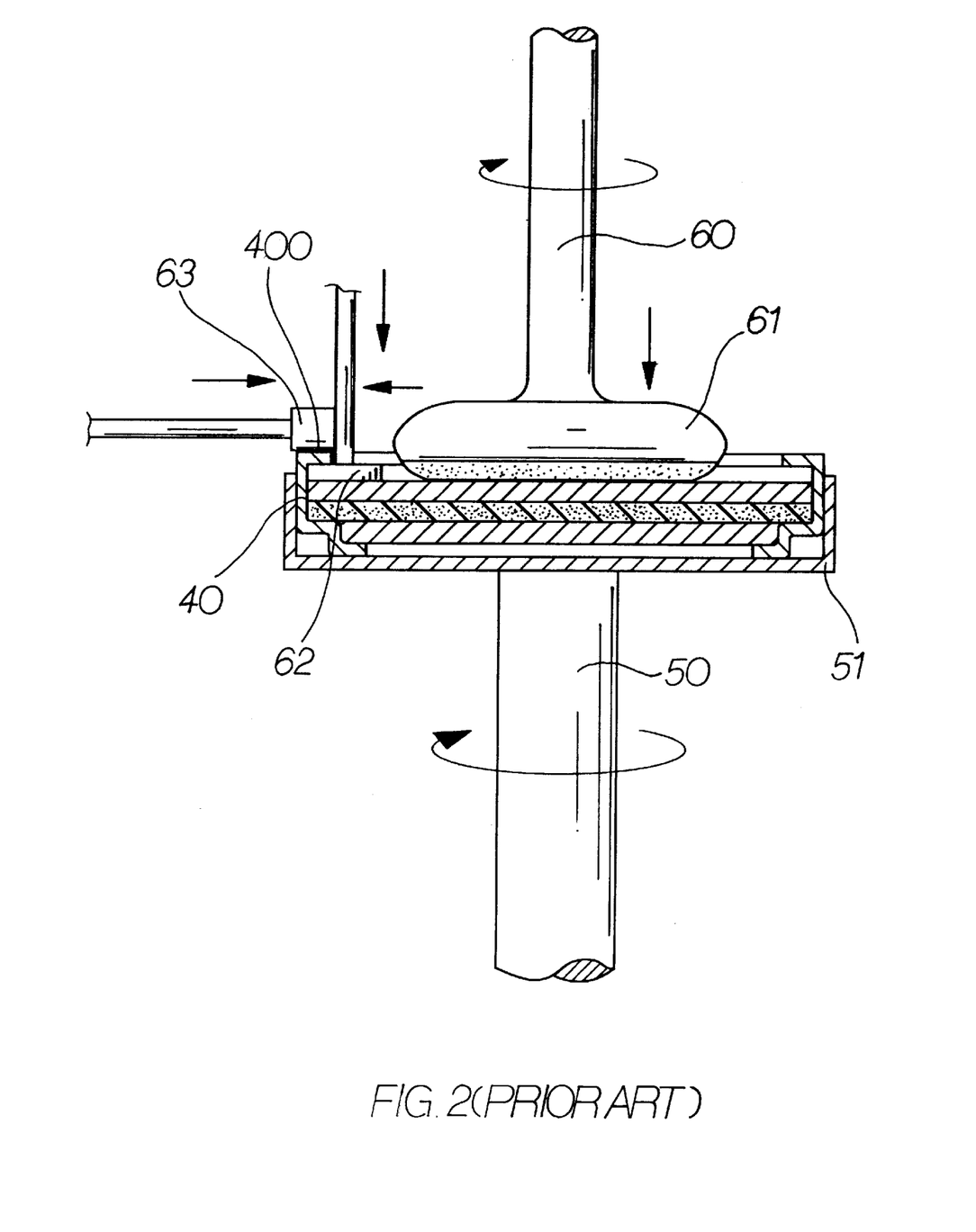
FIG. 2 shows a schematic view of a fabrication in progress of the vanity made integrally by the prior art method as shown in FIG. 1.
Figure 3:
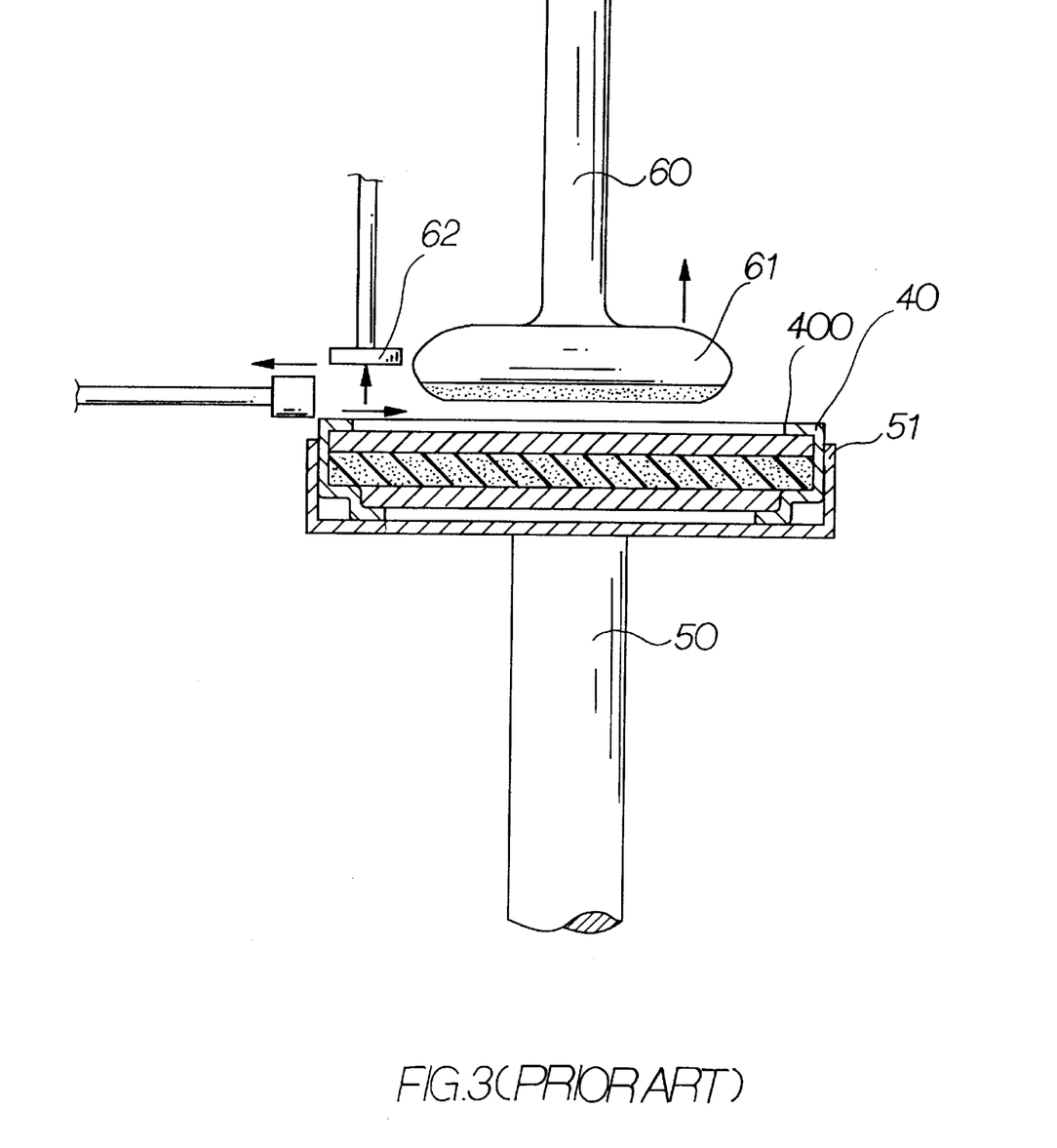
FIG. 3 shows a schematic view of a post-fabrication of the vanity made integrally by the prior art method as shown in FIG. 1.

As shown in FIGS. 1–3, the Taiwan Patent No. 326391 discloses a method for making integrally a mirror frame. The method includes the use of an exclusive machine, which comprises a lower rotary shaft 50 provided in the top thereof with a U-shaped receiving seat 51 which is in turn provided with an upper rotary shaft 60 concentric with the upper rotary shaft 50. The upper rotary shaft 60 is provided at the bottom end thereof with a press wheel 61 which is in turn provided inn the underside thereof with a soft plastic pad 610. The receiving seat 51 is provided in one side thereof with a side press wheel 63 and a locating wheel 62, as shown in FIG. 1.

The method involves a step in which a mirror frame 40 is arranged on the receiving seat 51. The mirror frame 40 has one side which is formed by punching and pressing. The side edges of the mirror frame 40 are not yet punched and pressed. The side edges face upward and are jutted out of the top edge of the receiving seat 51, as shown in FIG. 1. In the meantime, the mirror frame 40 is provided sequentially with a mirror 41, a sponge body 42, and another mirror 41. As the lower rotary shaft 50 is rotated, the receiving seat 51 and the mirror frame 40 are actuated to turn. In the meantime, the upper rotary shaft 60 and the press wheel 61 are actuated to turn so as to descend to press against the mirror 41 and the sponge body 42, as shown in FIG. 2. The locating wheel 62 is descended to press against the frame side of the mirror frame 40. The side press wheel 63 is moved toward the mirror frame 40 such that the side edge of the mirror frame 40 is forced by the side press wheel 63 to curve inwards to form a curved edge 400, as shown in FIG. 2. Thereafter, the side press wheel 63 and the press wheel 61 are moved back to their original positions. In light of the curved edge 400 being located on the top of the locating wheel 62, the locating wheel 62 must be moved inwards and away from the curved edge 400 before the locating wheel 62 is raised to return to its original position, thereby concluding the method for making integrally a mirror frame.

Such a prior art method as described above is no doubt capable of making integrally a vanity; nevertheless it has several shortcomings, which are described hereinafter.

The recovery of the position of the locating wheel 62 is time-consuming in view of the fact that the curved edge 400 is located on the top of the locating wheel 62, as shown in FIG. 2. As a result, before the position recovery of the locating wheel 62 is brought about, the locating wheel 62 must be moved inwards so as to be raised upwards to return to its original position. The drive structure of the locating wheel 62 is thus rather complicated.

The mirror or mirror frame is vulnerable to damage due to the speed differential of the upper rotary shaft 60 and the lower rotary shaft 50. The upper rotary shaft 60 and the lower rotary shaft 50 are driven respectively by two independent motors. When these two motors operate at different speeds, the mirror frame 40 and the receiving seat 51 are in motion relative to each other. As a result, the mirror 41 or the mirror frame 40 is prone to damage.

As shown in FIG. 3, the curved edge 400 is disposed horizontally such that the surface contact can not be easily fixed. As a result, the mirror 41 is not firmly fixed with the mirror frame 40.

The horizontal pleats of the curved edge 400 can inflict a wound on a person's fingers. As shown in FIG. 3, the pleats of the curved edge 400 are horizontally oriented, the fingers are especially susceptible to cut when the fingers inadvertently come in contact with the horizontally-oriented pleats of the curved edge 400.

SUMMARY OF THE INVENTION

It is therefore the primary objective of the present invention to provide a cost-effective method for making integrally a vanity.

It is another objective of the present invention to provide a damage-free method for making integrally a vanity.

It is still another objective of the present invention to provide a method for making integrally a vanity such that the mirror frame so made is provided with a curved edge capable of holding effectively the mirror and of minimizing the risk of the finger injuries by the curved edge.

In keeping with the principle of the present invention, the foregoing objectives of the present invention are attained by a method comprising an initial step in which a mirror frame having a curved side is arranged in a rotary receiving seat such that the uncurved sides of the mirror frame are jutted out of the top edge of the rotary receiving seat. Thereafter, the mirror is pressed by a press disk in a direction toward the interior of the mirror frame. In the meantime, the mirror frame is provided on a side edge thereof with a rolling wheel perpendicular to the rotary receiving seat. The rolling wheel is provided in the wheel rim thereof with an arcuate groove. The mirror frame and the press disk are actuated by the rotary receiving seat to turn, thereby enabling the protruded edge of the mirror frame to be pressed slowly by the rolling wheel such that the protruded edge is provided with a curved edge which is formed by the arcuate groove of the rolling wheel, and that the mirror is fixed by point fastening. The rolling wheel and the press disk are then returned to their respective original position to conclude the method of the present invention.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 4:
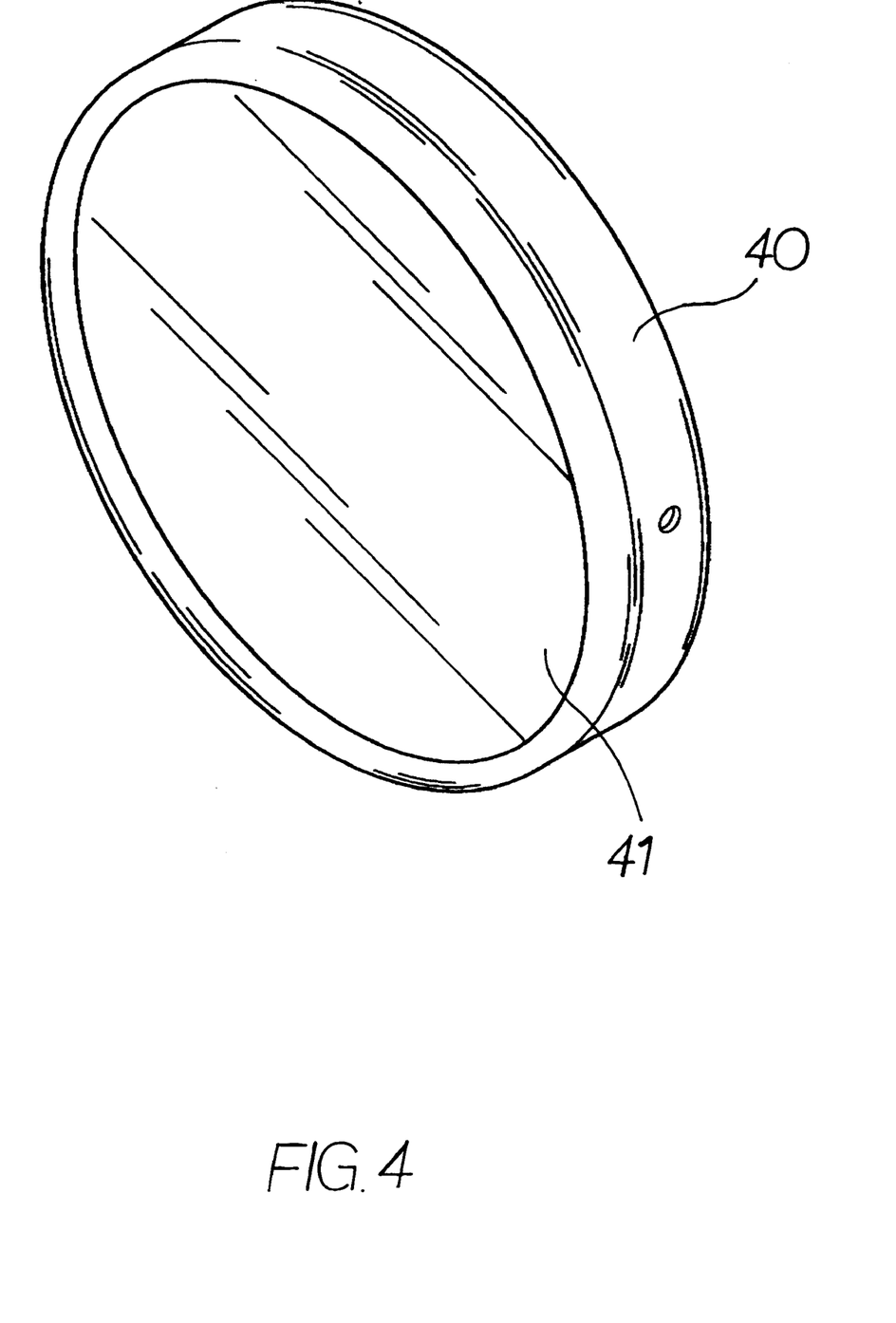
FIG. 4 shows a perspective view of a vanity made by the method of the present invention.
Figure 5:
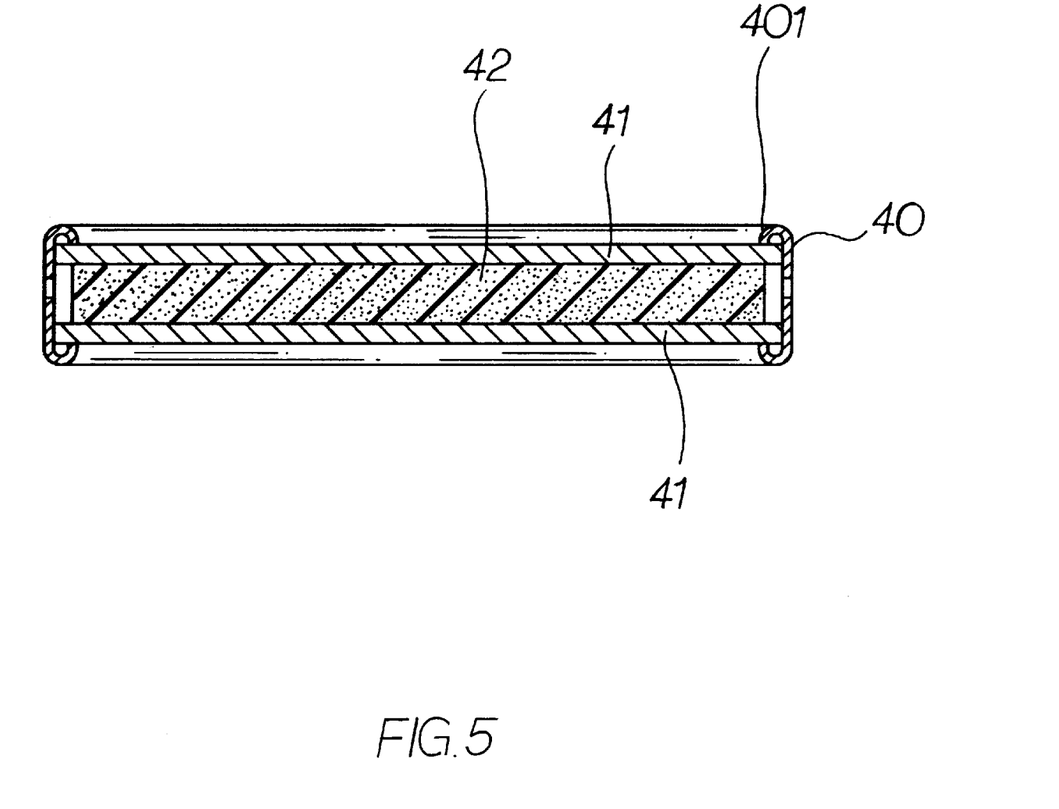
FIG. 5 shows a longitudinal sectional view of the vanity made by the method of the present invention.

As shown in FIGS. 4 and 5, a vanity made by a method of the present invention is formed of a mirror frame 40, two mirrors 41, and a sponge body 42 sandwiched between the two mirrors 41. The mirrors 41 are held by the curved edges 401 of the mirror frame 40. The vanity is made by the method, which is described hereinafter with reference to FIGS. 6, 7, and 8.

Figure 6:
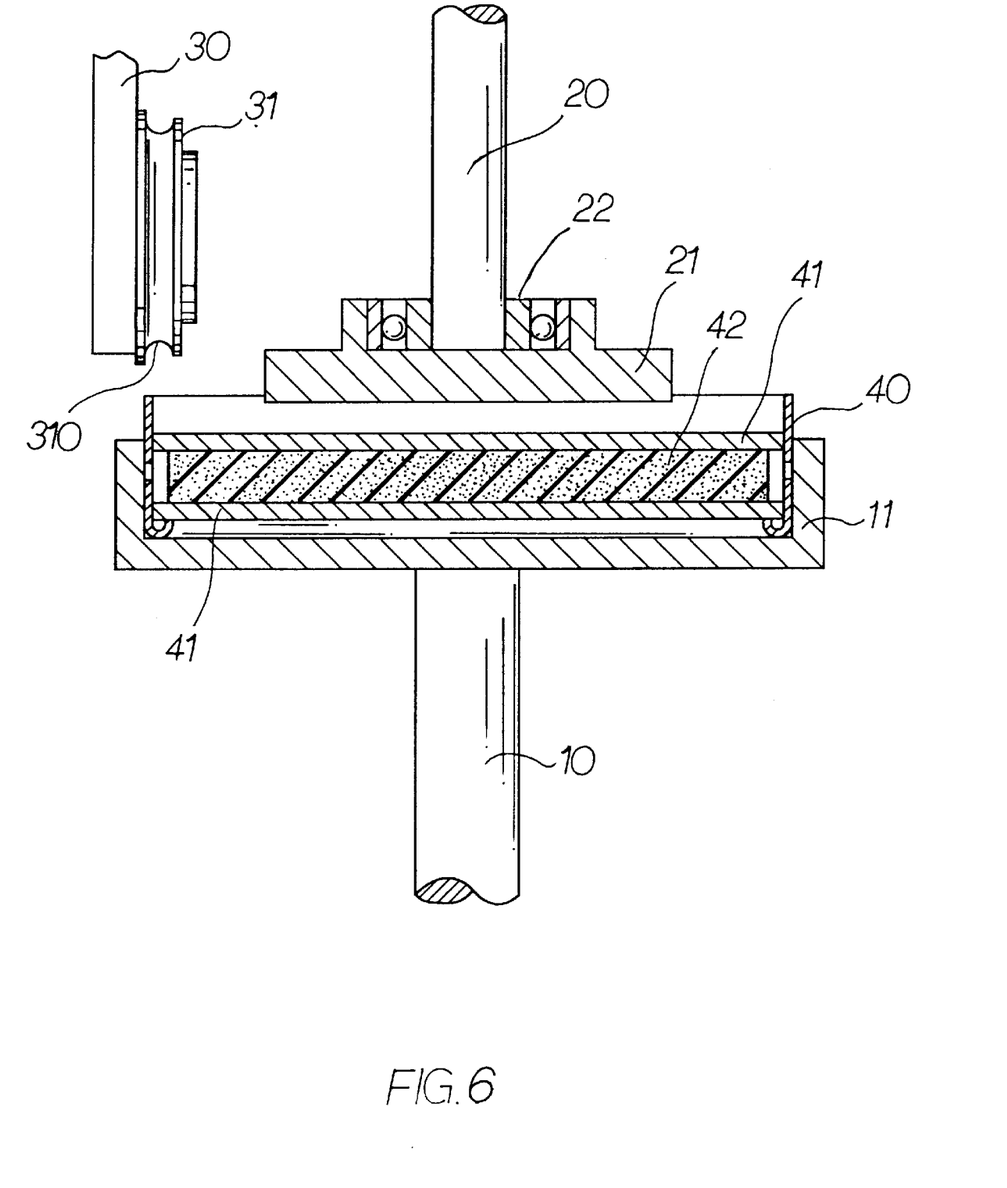
FIG. 6 shows a schematic view of a pre-fabrication of the vanity made integrally by the method of the present invention.
Figure 7:
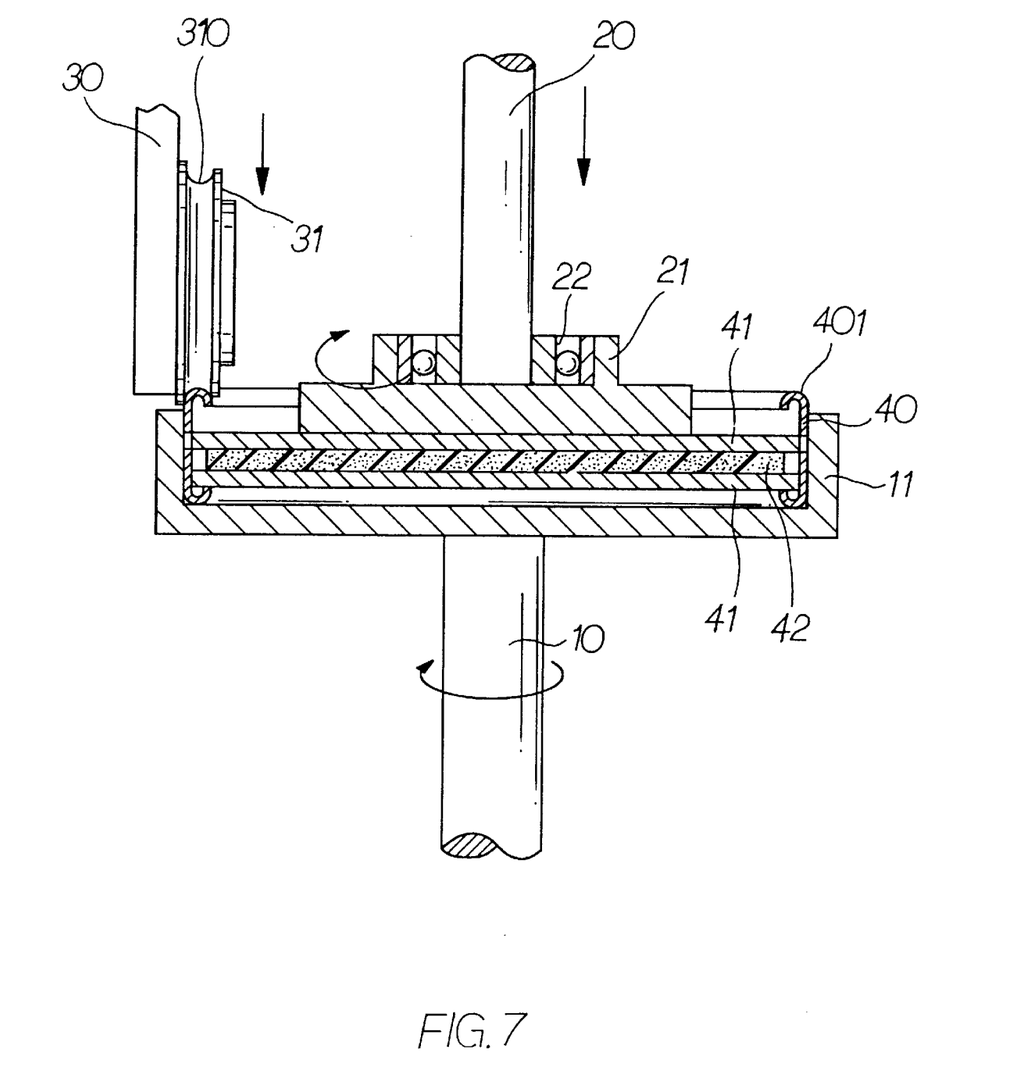
FIG. 7 shows a schematic view of a fabrication in progress of the vanity made integrally by the method of the present invention.
Figure 8:
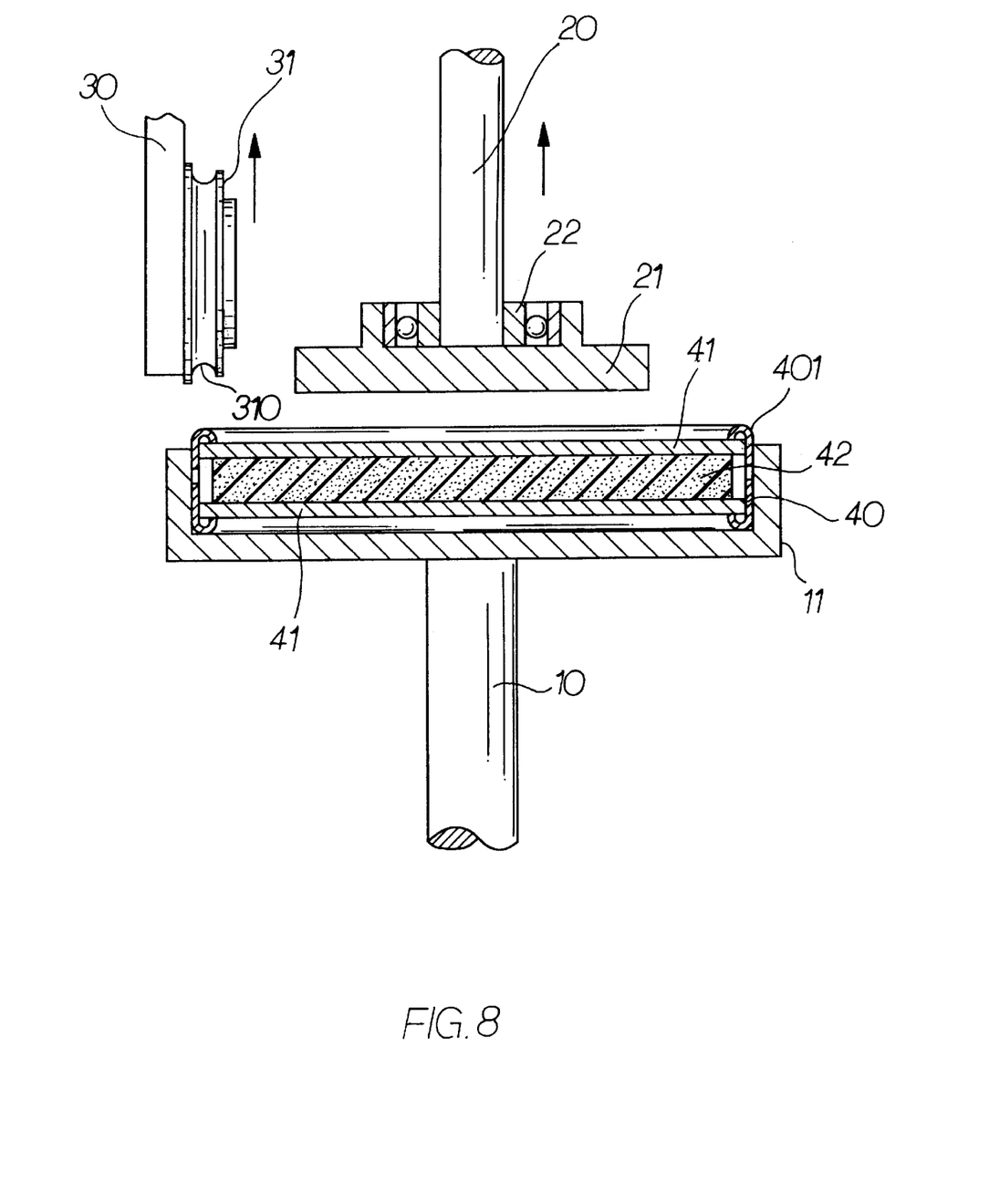
FIG. 8 shows a schematic view of a post-fabrication of the vanity made integrally by the method of the present invention.

The method of the present invention comprises a first step in which one side of a mirror frame 40 is punched and pressed, with other side of the mirror frame 40 remaining unpunched and unpressed. The mirror frame 40 is then disposed in a rotary receiving seat 11 such that the other side of the mirror frame 40 faces upward, and that the other side of the mirror frame 40 is jutted out of the top edge of the rotary receiving seat 11, as shown in FIG. 6. The rotary receiving seat 11 is fastened at the center of the underside thereof with a rotary shaft 10 and is provided thereover with a lift rod 20 which is pivoted at the bottom thereof with a soft press disk 21 by a bearing 22. The mirror frame 40 is provided on a side edge thereof with a rolling wheel 31 perpendicular to the rotary seat 11. The rolling wheel 31 is provided in the wheel rim thereof with an arcuate groove 310. In operation, the rotary receiving seat 11 and the mirror frame 40 are actuated by the rotary shaft 10 to turn such that the lift rod 20 is lowered to cause the press disk 21 to press the mirror 41. The press disk 21 is actuated to turn along with the rotary receiving seat 11 and the mirror frame 40. The lift rod 30 of the rolling wheel 31 presses slowly the protruded edge of the mirror frame 40 in motion, thereby resulting in the formation of a curved edge 401 on the side edge of the mirror frame 40 by the arcuate groove 310 of the rolling wheel 31, as shown in FIG. 7. Finally, the rolling wheel 31 and the press disk 20 are lifted to return to their original positions, as shown in FIG. 8. The sponge body 42 is relieved of the pressure exerting thereon. The mirrors 41 are held securely by the curved edges 401 of the mirror frame 40.

The method of the present invention is cost-effective and efficient. The curved edge 401 of the mirror frame 40 is formed by the arcuate groove 310 of the rolling wheel 40, without the use of the locating wheel of the prior art method. The rolling wheel 31 can be operated with east and speed.

In light of the press disk 21 and the rolling wheel 31 of the method of the present invention being designed as driven members, which are driven by the rotary shaft 10, the mirror frame 40 and the mirror 41 are not susceptible to damage.

The mirrors are securely held by the curved edges of the mirror frame. Such a point fastening method of the present invention is superior to the prior art method.

The mirrors are confined by the cross section of the curved edge such that the sharp edge of the curved edge is concealed to provide the fingers of a person with protection against cut.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A method for making integrally a vanity, said method comprising an initial step in which a mirror frame, whose one side has been punched and pressed and whose other side has not been punched and pressed, is arranged in a rotary receiving seat such that the other side of the mirror frame faces upward and extends beyond the top of the rotary receiving seat, said method further comprising a press disk which can be lowered to press a mirror, said mirror frame provided in a side edge thereof with a rolling wheel perpendicular to the side edge, said rolling wheel provided in the wheel rim thereof with a groove, said rotary receiving seat actuating the mirror frame and the press disk pressing the mirror to turn whereby the rolling wheel is slowly lowered to form a curved edge in a protruded edge of the mirror frame by the groove of the wheel rim of the rolling wheel, the rolling wheel and the press disk being finally lifted to return to their original positions.

2. The method as defined in claim 1, wherein said rotary receiving seat is fastened at the center of the underside thereof with a rotary shaft for driving the rotary receiving seat.

3. The method as defined in claim 1, wherein said press disk is provided with a lift rod for controlling the up-and-down motion of the press disk.

4. The method as defined in claim 3, wherein said lift rod is fastened at the bottom thereof with said press disk by a bearing.

5. The method as defined in claim 1, wherein said rolling wheel is provided with a lift rod for controlling the up-and-down motion of the rolling wheel.

6. The method as defined in claim 1, wherein said groove of the wheel rim of said rolling wheel is arcuate in shape.

* * * * *